US005096587A

United States Patent [19]

Charette

[11] Patent Number: 5,096,587

[45] Date of Patent: Mar. 17, 1992

[54] HYDROCYCLONE CONDUIT

[75] Inventor: Ernest J. Charette, Taunton, Mass.

[73] Assignee: Bird Escher Wyss, Mansfield, Mass.

[21] Appl. No.: 562,208

[22] Filed: Jul. 31, 1990

[51] Int. Cl.[5] ........ B01D 21/26

[52] U.S. Cl. ........ 210/512.2; 210/335; 210/512.1; 55/459.1; 209/144; 209/211; 138/115

[58] Field of Search ........ 210/335, 512.1, 512.2, 210/787, 85, 87, 90; 55/459.1; 209/144, 211; 138/115

[56] References Cited

U.S. PATENT DOCUMENTS

| | | | |
|---|---|---|---|
| 2,635,330 | 4/1953 | Fentress | 138/128 |
| 3,959,150 | 5/1976 | Frykhult et al. | 210/512.2 |
| 4,019,980 | 4/1977 | Beery | 209/211 |
| 4,462,899 | 7/1984 | Wambsgans | 209/211 |
| 4,572,787 | 2/1986 | Robinson | 210/512.2 |
| 4,650,584 | 3/1987 | Macierewicz | 210/512.2 |
| 4,655,923 | 4/1987 | Leone | 210/512.2 |

*Primary Examiner*—Robert A. Dawson
*Assistant Examiner*—David Reifsnyder
*Attorney, Agent, or Firm*—Fish & Richardson

[57] ABSTRACT

Hydrocyclone separators of the type used to separate contaminants from pulp suspensions in paper mills are connected to feed, accept, and reject conduits using a conduit apparatus in which both feed and accept portions are preferably bent from smooth plate material. The feed and accept portions preferably include generally flat surfaces through which holes are drilled for making connections to the feed and accept nozzles of the hydrocyclones. The smooth plate material eliminates the tendency of pulp to build up on the conduit walls and in the nozzles, thereby avoiding the problems that can occur when such build ups break loose. The nozzles of the hydrocyclones are preferably attached by placing a resilient sealing member around the circumference of the nozzle, and inserting the nozzle into an aperture formed in a generally flat wall of the conduit until the sealing member engages the inside wall of the aperture.

12 Claims, 2 Drawing Sheets

HYDROCYCLONE CONDUIT

BACKGROUND OF THE INVENTION

This invention relates to hydrocyclone separators such as are typically used to remove contaminants from solid-liquid suspensions (e.g., pulp suspensions in paper mills).

Hydrocyclone separators are connected to feed, accept, and reject conduits by a conduit apparatus. The hydrocyclones are typically sealed to the conduit apparatus to prevent leakage of liquid. The connections between the hydrocyclones and the conduit apparatus should be easy to remove and replace to allow for cleaning, monitoring, repair, and replacement of the hydrocyclones.

One prior art approach to making these connections is to use flexible hoses and hose clamps to connect the ends of small diameter pipes welded to cylindrical conduits and corresponding small diameter nozzles projecting from the hydrocyclones.

Another approach is described in U.S. Pat. No. 3,959,150 to Frykhult. Small diameter telescoping pipes on cylindrical conduits mate telescopically with smaller diameter nozzles on the hydrocyclones. The pipes on the conduits are sized so that the nozzles fit inside of the pipes in sealing engagement. An o-ring placed around the nozzle before insertion engages the interior of the pipes and prevents leakage.

SUMMARY OF THE INVENTION

In one aspect the invention features forming the conduit apparatus by bending plate material (preferably smoothed prior to bending). At least one generally flat surface is provided for making connections between the hydrocyclones and the conduit apparatus, and preferably apertures are provided through the wall of this flat surface for receiving the nozzles of the hydrocyclones. Using smooth plate material allows for a cleaner flow of the suspension, thereby eliminating buildup of solids on the conduit walls and in the nozzles, and avoiding the problems that can occur when accumulations of solid material break loose and travel elsewhere in the system.

Preferred embodiments of the invention include further features. Both the feed and accept portions of the conduit apparatus are bent from plate material and have a generally flat surface with a plurality of apertures through their wall for receiving the nozzles of the hydrocyclones. The feed and accept portions are each bent into a U-shape and joined to a partition wall that separates them. The plate material is made from polished stainless steel machined to have a smoothness of better than 125 microinches. Sealing members (e.g., o-rings) are utilized in cooperation with the plurality of apertures. Strain gauges are positioned on the partition wall to measure the pressure difference between the feed liquid-solid suspension and the accept materials.

In another aspect the invention features attaching the nozzles of a hydrocyclone to their respective conduits by placing resilient sealing members around the circumference of the nozzles, and inserting the nozzles into apertures formed in the generally flat wall of the conduit apparatus, so that the sealing member engages the wall of the aperture. The invention provides an improved and simpler to manufacture seal between the conduit and the hydrocyclones. It does not require hoses, which are prone to failure, and eliminates the use of telescoping sealing members which are more complex and expensive to manufacture (e.g., because of the difficulty associated with holding adequately tight tolerances while welding the necessary tubes to the conduit), and which are susceptible to damage. Also, it eliminates the added roughness caused by welding the telescoping members onto the conduits, and therefore further eliminates buildup of solids in that area.

Other advantages of the invention include reducing the floor space required for the assembly of conduits and hydrocyclones, and providing easier maintenance, repair, and replacement of the hydrocyclones. Additionally, the invention can provide a means to easily and accurately measure the pressure drop between the feed and the accept conduits, a measurement necessary for proper monitoring and control of the apparatus.

These and other features and advantages of the invention will be apparent from the following description of the preferred embodiment, and from the claims.

DESCRIPTION OF THE PREFERRED EMBODIMENTS

We first briefly describe the drawings.

Figure 1:
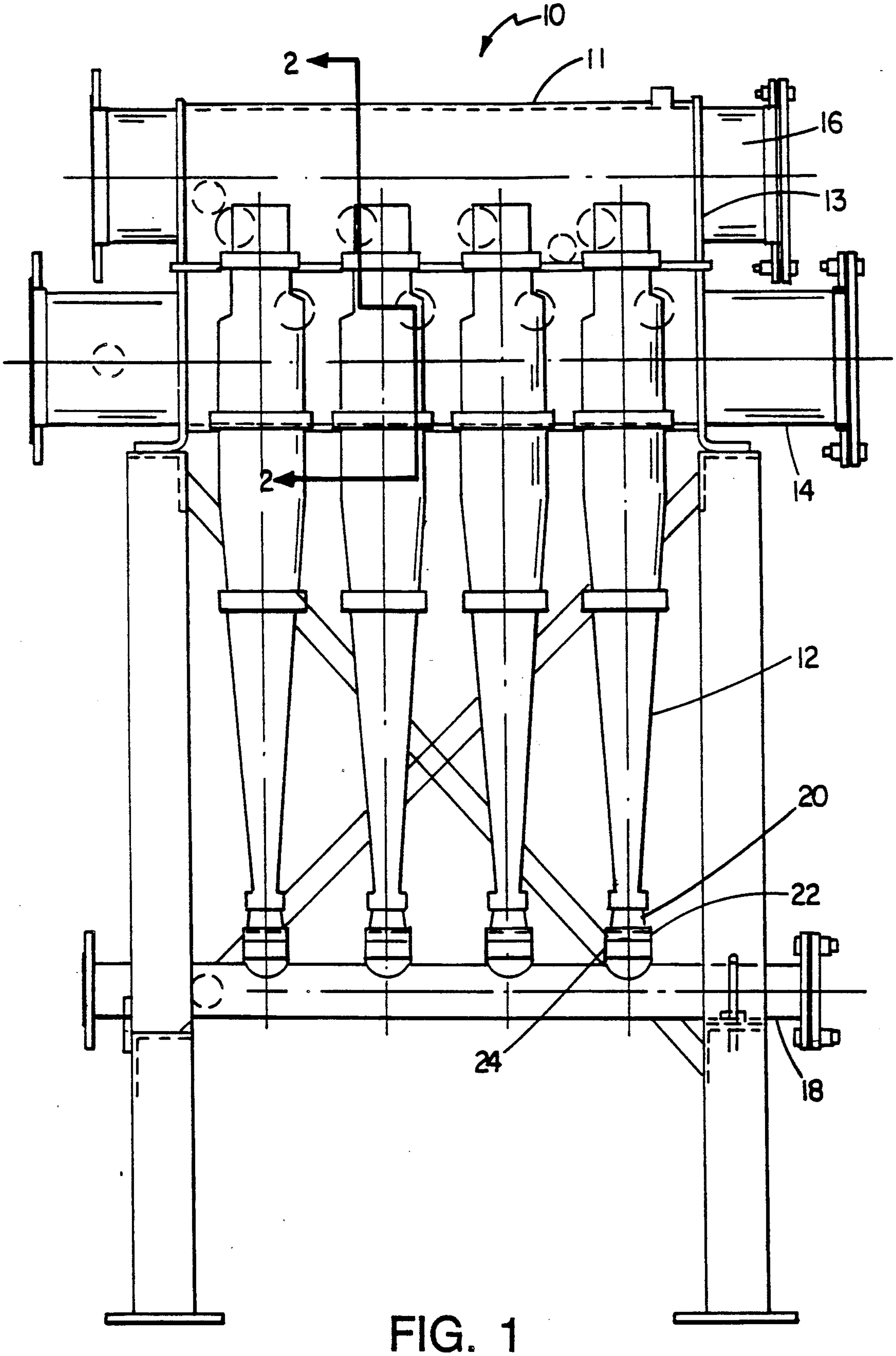
FIG. 1 is an elevation view of a preferred embodiment of the invention.

Referring now to FIG. 3, a typical hydrocyclone arrangement 10 includes eight hydrocyclones 12 attached to a feed/accept conduit 11 having two end plates 13. In this embodiment, the hydrocyclones are arranged with four on each side (four are not shown). A feed conduit 14 transports a liquid-solid suspension, i.e. pulp stock, to the hydrocyclone arrangement, while an accept conduit 16 receives the acceptable portion of the suspension and conducts it to the next processing station. A reject conduit 18 removes the unacceptable portion. The feed conduit and the accept conduit are attached to the end plates of the hydrocyclone arrangement via welding.

A telescoping nozzle is utilized to attach the hydrocyclone to the reject conduit 18. More specifically, the nozzle includes an inner pipe 20, attached to the hydrocyclone in an axial orientation to the hydrocyclone, which has a groove located around the circumference of the pipe 20 adapted to maintain an o-ring 22 therein. The reject conduit 18 includes a nozzle connection 24 which includes an outer pipe of a relatively larger diameter than that on the hydrocyclone. The inner pipe fits inside of the outer pipe with sufficient clearance to allow for the hydrocyclone to pivot in any direction, and the o-ring forms a seal between the two pipes when the hydrocyclone is in a proper position. The means of attachment of the feed and accept conduits to the hydrocyclones is described below.

Figure 2:
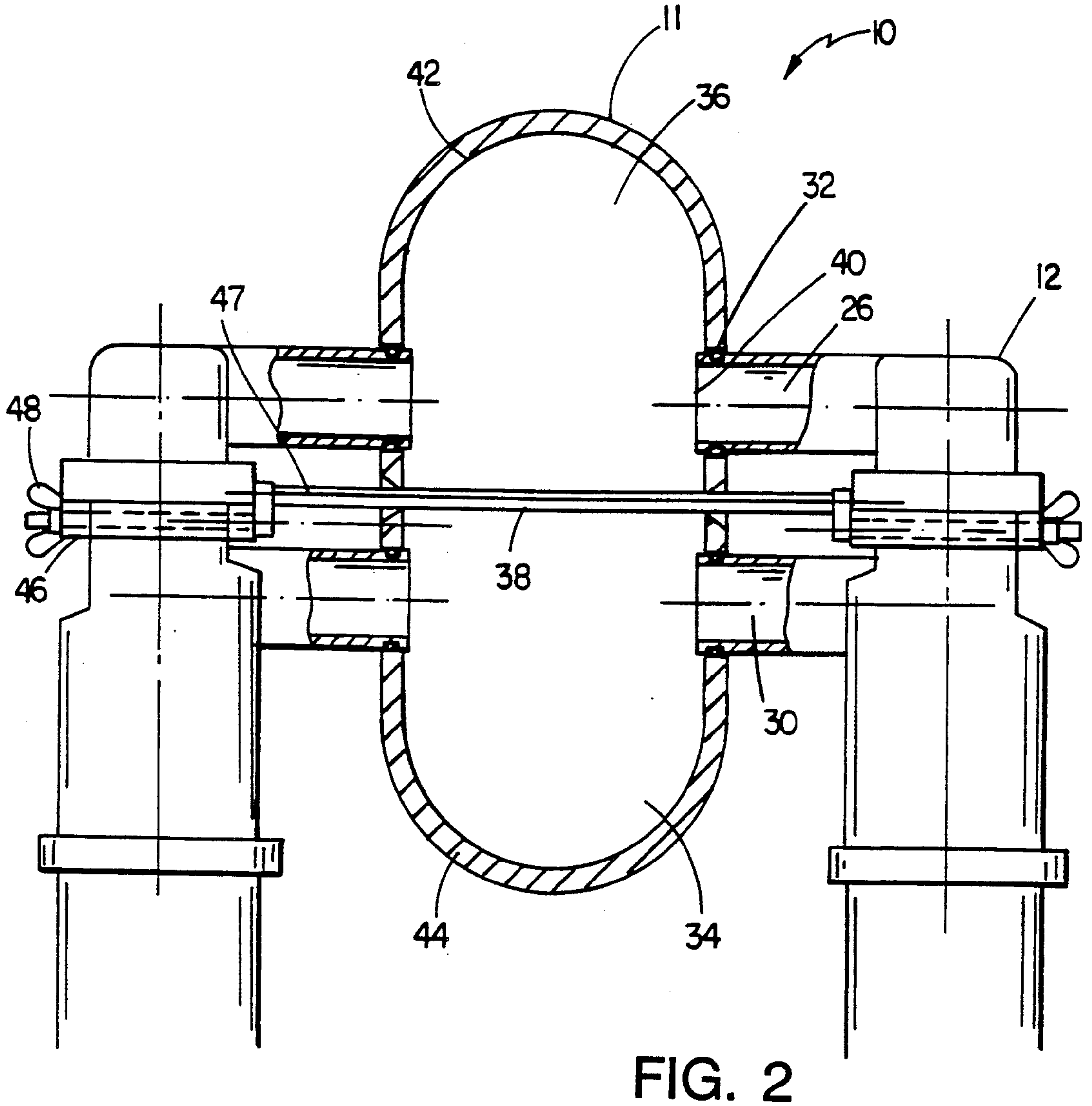
FIG. 2 is a partial cross-sectional view taken at section line 2—2 of FIG. 1.

FIG. 2 is an illustration of the top portion of a hydrocyclone arrangement 10 of the invention. Hydrocyclones 12 are attached to both sides of the feed/accept conduit 11. Each hydrocyclone 12 includes two nozzles 26, 30 which are oriented orthogonally to the axis of the hydrocyclone and are adapted for attachment onto the feed/accept conduit 11. Each nozzle includes a groove located around the circumference of the nozzle adapted to maintain an o-ring member 32. The feed/accept conduit 11 includes two compartments, a feed compartment 34 and an accept compartment 36. These two compartments are separated by a partition 38. The feed/accept conduit 11 has two U-shaped sections in a face-to-face orientation so that they form a closed surface having two generally flat sides. These generally flat sides must be flat enough to maintain an o-ring in sealing engagement with the wall of the feed/accept conduit, however, they need not be perfectly flat. Conduit apertures 40, provided on these flat surfaces, are adapted to receive the hydrocyclone nozzles 26, 30. The o-ring member provides sealing between the feed/accept conduit and the hydrocyclone.

The dimensions for the feed/accept conduit are described below. Note that these dimensions are specific to a feed/accept conduit designed to accommodate eight hydrocyclones, and that the dimensions will vary for differing arrangements. The feed/accept conduit is approximately 4 feet in length, 20 inches high, and 8 inches wide. The feed/accept conduit 11 is manufactured from three sheets of ½ inch thick stainless steel plate. Two of these sheets 42, 44 are 24 inches by 48 inches on a side and are each formed into a U-shape, while the third sheet 47 is 16 inches by 48 inches on a side and is maintained flat. This flat sheet acts as the partition dividing the feed compartment and the accept compartment (described above) and also as a support for the hydrocyclones in the arrangement. This flat sheet is 8 inches wide in the interior of the conduit and extends 4 inches on each side of the outer feed/accept conduit wall. Attached to the ends of this flat sheet are split clamps 46 which, when closed, surround the circumference of the hydrocyclone and are secured by threaded bolt and nut combinations 48.

The manufacturing process comprises the following steps. Each of the three plates is polished by a standard metal polisher of the art to a 16 microinch finish which creates a smooth surface on the interior of the conduit. Variations in smoothness are possible, but the surface should have better than a 125 microinch finish (the approximate finish of standard pipe), and preferably at least a 63 microinch finish. Standard pipe (125 microinches at best) has the tendency to cause pulp buildup on the wall, which can break loose causing problems elsewhere in the system. The edges of the plate are ground down to create a relief for welding. The plates are bent (using conventional techniques) to form the U-shapes described above, and then the two U-shaped plates are welded onto the flat plate to form the proper shape. These welds are performed on the outside surface of the hydrocyclone arrangement. Conduit apertures of 2.75 inch diameters are drilled into the flat surfaces of the feed/accept conduit.

The method of attaching the hydrocyclones 12 to the feed/accept conduit 11 includes the following steps. An o-ring is placed in each of the grooves contained on each of the hydrocyclone nozzles. The axially oriented pipe 20 of the nozzle is placed within the outer tube 24 of the reject conduit 18 and the hydrocyclone is oriented so that the orthogonally oriented nozzles 26, 30 are in a face-to-face relationship with the conduit apertures 40. Sufficient clearance is provided between the nozzle and the outer pipe to allow the hydrocyclone to pivot about that point, but still maintain a sealing engagement. The orthogonally oriented nozzles are tilted slightly toward and into the conduit apertures until each of the o-ring sealing members is positioned so that it seals against the wall of the aperture in the feed/accept conduit, thereby creating a good seal. The hydrocyclones are then secured to the assembly via the split clamp and nut/bolt combination.

An alternate embodiment of the invention includes a method of determining the pressure difference between the feed and accept compartments in order to monitor and control the operation of the hydrocyclones. Strain gauges are placed on the partition 38 between the two compartments to measure the deflection of the partition. Because there is a pressure drop between the feed and accept compartments, there should be a deflection in the direction from the feed compartment to the accept compartment. The magnitude of the deflection, as measured by the strain gages, will determine the force in that direction which can be used to calculate the pressure difference.

Other embodiments are within the following claims.

What is claimed is:

1. A conduit apparatus for connecting a plurality of hydrocyclones to feed, accept, and reject conduits wherein the hydrocyclones are external to the conduit apparatus, said conduit apparatus comprising a feed portion configured to transport feed materials from said feed conduit to said plurality of hydrocyclones, an accept portion bent into shape from plate material and configured to transport accept materials from said plurality of hydrocyclones to said accept conduit, a reject portion configured to transport reject materials from said plurality of hydrocyclones to said reject conduit, said feed, accept, and reject portions having exterior walls in which there are apertures through which feed, accept, and reject materials are transported to or from said hydrocyclones located external to said exterior walls, a said exterior wall of said accept portion comprising at least one generally flat surface having a plurality of said apertures therethrough, each said aperture sized and configured for attachment of an accept nozzle of a said hydrocyclone.

2. The conduit apparatus of claim 1 further comprising said feed portion bent into shape from plate material and configured to transport a feed liquid-solid suspension to said plurality of hydrocyclones, and a said exterior wall of said feed portion comprising at least one generally flat surface having a plurality of said apertures therethrough, each said aperture sized and configured for attachment of a feed nozzle of a said hydrocyclone.

3. The conduit apparatus of claim 2 wherein said feed and accept portions are separated by a partition wall.

4. The conduit apparatus of claim 3 wherein said feed and accept portions comprise two U-shaped sections joined at said partition wall.

5. The conduit apparatus of claim 2 or 4 wherein said plate material comprises stainless steel having a smoothness of better than 125 microinches.

6. The conduit apparatus of claim 5 wherein said plate material comprises stainless steel having a smoothness of 63 microinches or better.

7. The conduit apparatus of claim 6 wherein said U-shaped sections are joined to said partition wall by welding.

8. The conduit apparatus of claim 5 wherein said U-shaped sections are joined to said partition wall by welding.

9. The conduit apparatus of claim 2 or 4 combined with said hydrocyclones, and wherein said hydrocyclones are sealed to said feed and accept portions using sealing members.

10. The conduit apparatus of claim 9 wherein said sealing members comprise o-rings fitted around the feed and accept nozzles of said hydrocyclones.

11. The conduit apparatus of claim 10 wherein said o-rings seal only against the narrow, generally-cylindrical inside surface of said apertures.

12. The conduit apparatus of claim 3 further comprising strain gages positioned on said partition wall, said strain gages being utilized to determine a pressure difference between said feed liquid-solid suspension and said accept materials.

* * * * *